(12) United States Patent
Komazawa

(10) Patent No.: US 12,718,351 B2
(45) Date of Patent: Aug. 25, 2026

(54) INFORMATION PROCESSING APPARATUS, METHOD, AND NON-TRANSITORY COMPUTER READABLE MEDIUM

(71) Applicant: FUJIFILM Business Innovation Corp., Tokyo (JP)

(72) Inventor: Hisao Komazawa, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/181,758

(22) Filed: Mar. 10, 2023

(65) Prior Publication Data

US 2024/0087109 A1 Mar. 14, 2024

(30) Foreign Application Priority Data

Sep. 13, 2022 (JP) ................................ 2022-145221

(51) Int. Cl.
*G06T 7/00* (2017.01)
*H04N 1/00* (2006.01)

(52) U.S. Cl.
CPC ......... *G06T 7/001* (2013.01); *H04N 1/00005* (2013.01); *H04N 1/00039* (2013.01); *G06T 2207/30144* (2013.01)

(58) Field of Classification Search
CPC .......... G06T 7/001; G06T 2207/30144; H04N 1/00005; H04N 1/00039
See application file for complete search history.

(56) References Cited

U.S. PATENT DOCUMENTS

2011/0310404 A1* 12/2011 Simske .............. H04N 1/00074 358/3.28
2020/0019353 A1 1/2020 Okajima
2020/0128135 A1* 4/2020 Matsushita ........... G06F 3/1243

FOREIGN PATENT DOCUMENTS

JP 2020-006603 A 1/2020

* cited by examiner

*Primary Examiner* — Oneal R Mistry
*Assistant Examiner* — Justin Phillip Cascais
(74) *Attorney, Agent, or Firm* — Oliff PLC

(57) ABSTRACT

An information processing apparatus includes a processor configured to: analyze print data to be inspected, to extract a region including an object included in the print data as an inspection region, for which a print result of the print data is to be inspected; set a precision level of an inspection to be performed on the extracted inspection region; and prepare inspection information including a position of the extracted inspection region and the precision level of the inspection to be performed on the inspection region, to set inspection information to be used for an inspection of the print result to the print data.

11 Claims, 10 Drawing Sheets

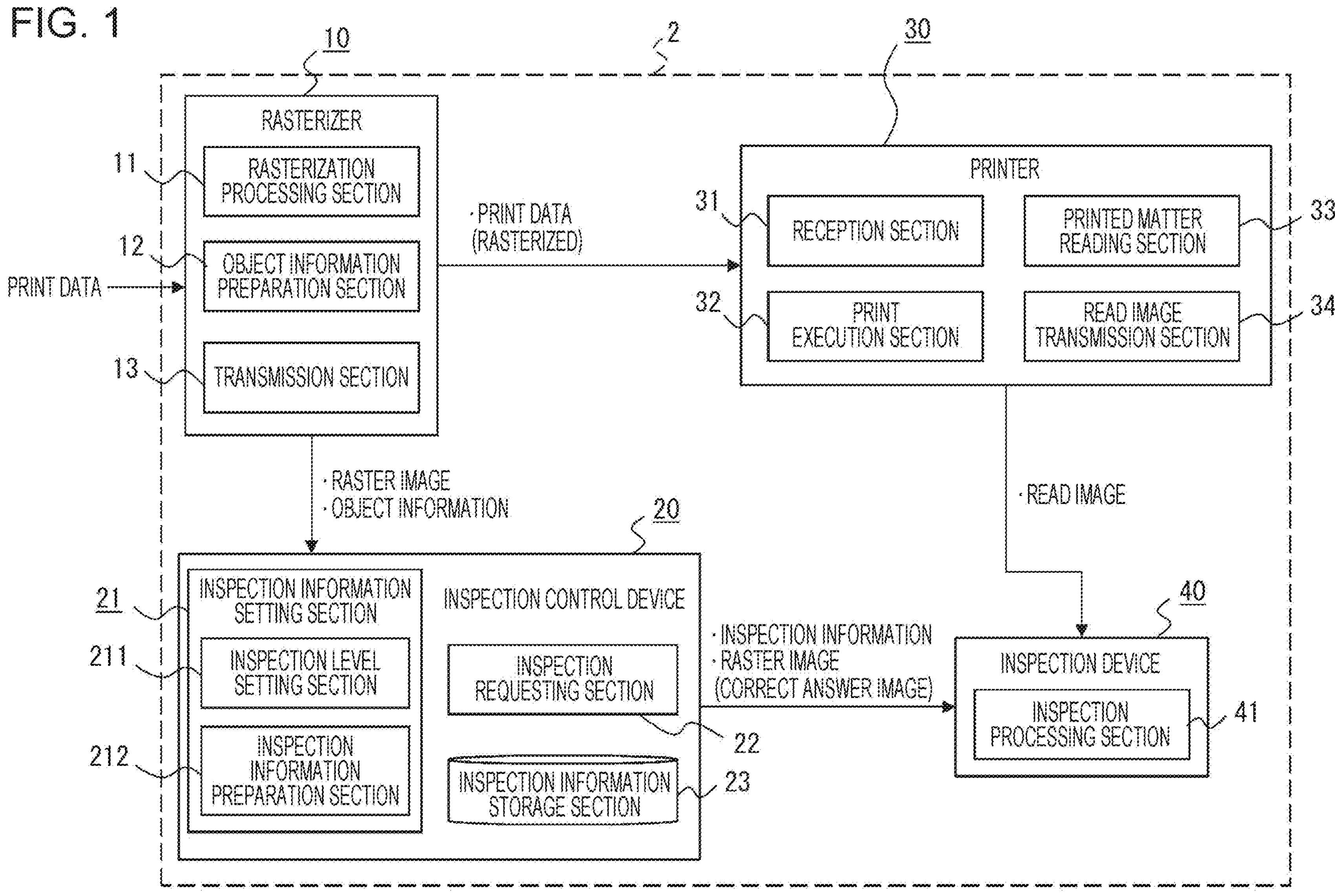
FIG. 1
10
2
30
RASTERIZER
11
RASTERIZATION PROCESSING SECTION
12
OBJECT INFORMATION PREPARATION SECTION
PRINT DATA
13
TRANSMISSION SECTION
· PRINT DATA (RASTERIZED)
PRINTER
31
RECEPTION SECTION
PRINTED MATTER READING SECTION
33
32
PRINT EXECUTION SECTION
READ IMAGE TRANSMISSION SECTION
34
· RASTER IMAGE
· OBJECT INFORMATION
· READ IMAGE
20
21
INSPECTION INFORMATION SETTING SECTION
INSPECTION CONTROL DEVICE
211
INSPECTION LEVEL SETTING SECTION
INSPECTION REQUESTING SECTION
212
INSPECTION INFORMATION PREPARATION SECTION
22
INSPECTION INFORMATION STORAGE SECTION
23
· INSPECTION INFORMATION
· RASTER IMAGE
(CORRECT ANSWER IMAGE)
40
INSPECTION DEVICE
INSPECTION PROCESSING SECTION
41

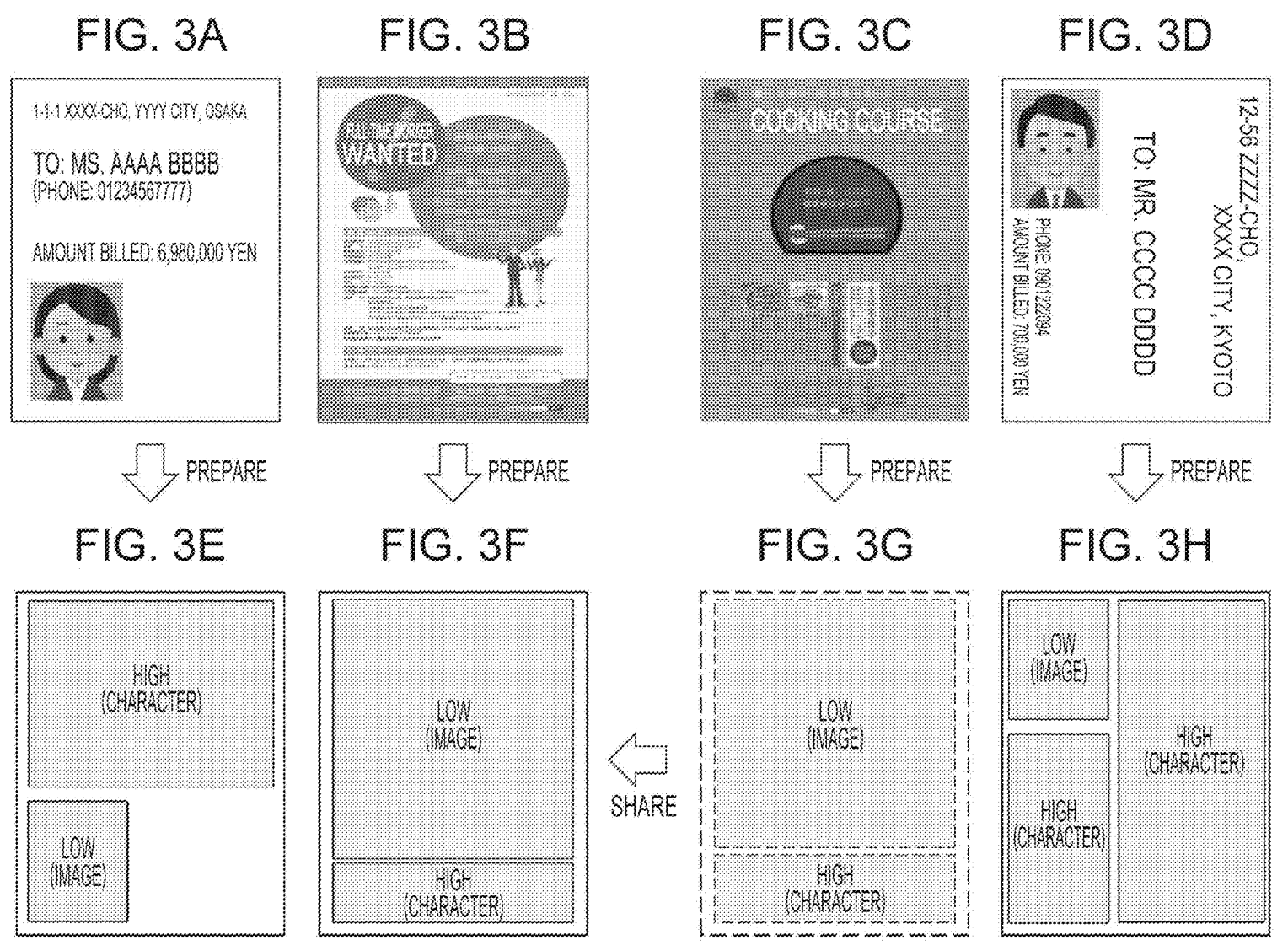

FIG. 3A 1-1-1 XXXX-CHO, YYYY CITY, OSAKA
TO: MS. AAAA BBBB
(PHONE: 0123456777)
AMOUNT BILLED: 6,980,000 YEN

PREPARE

FIG. 3E

HIGH (CHARACTER)
LOW (IMAGE)

FIG. 3B

WANTED

PREPARE

FIG. 3F

LOW (IMAGE)
HIGH (CHARACTER)

SHARE

FIG. 3C

COOKING COURSE

PREPARE

FIG. 3G

LOW (IMAGE)
HIGH (CHARACTER)

FIG. 3D 12-56 ZZZZ-CHO,
XXXX CITY, KYOTO
TO: MR. CCCC DDDD
PHONE: 0901222094
AMOUNT BILLED: 700,000 YEN

PREPARE

FIG. 3H

HIGH (CHARACTER)
LOW (IMAGE)
HIGH (CHARACTER)

FIG. 4A
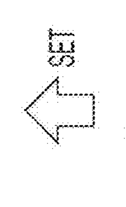
FIG. 4E
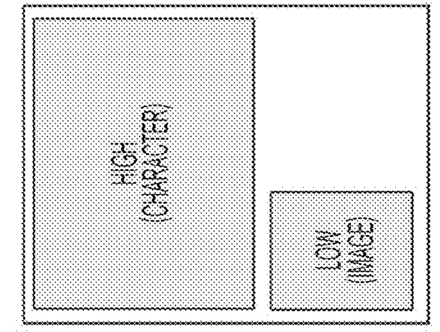
FIG. 4B
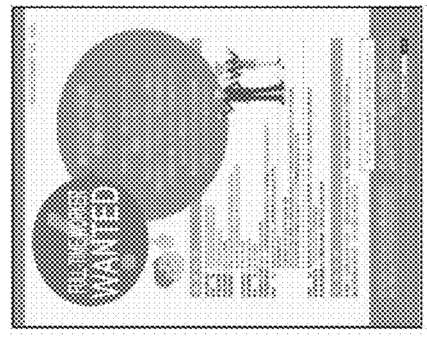
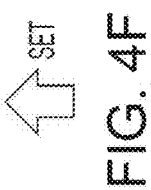
FIG. 4F
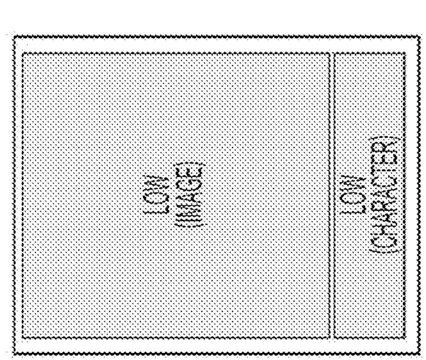
FIG. 4C
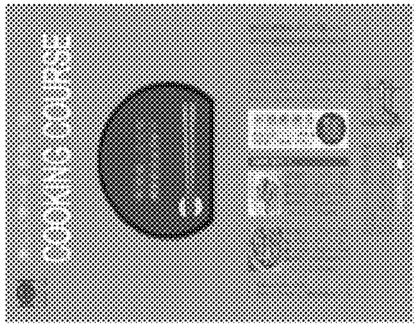
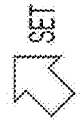
FIG. 4D
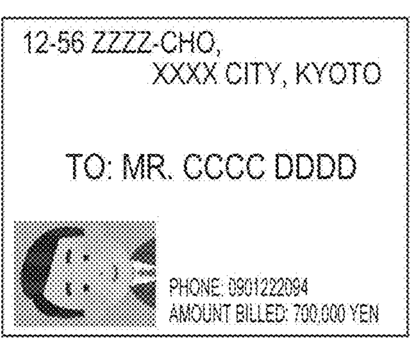
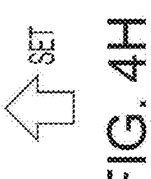
FIG. 4H
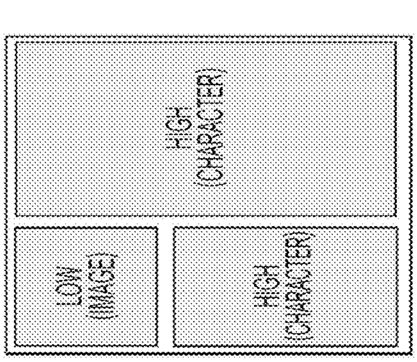

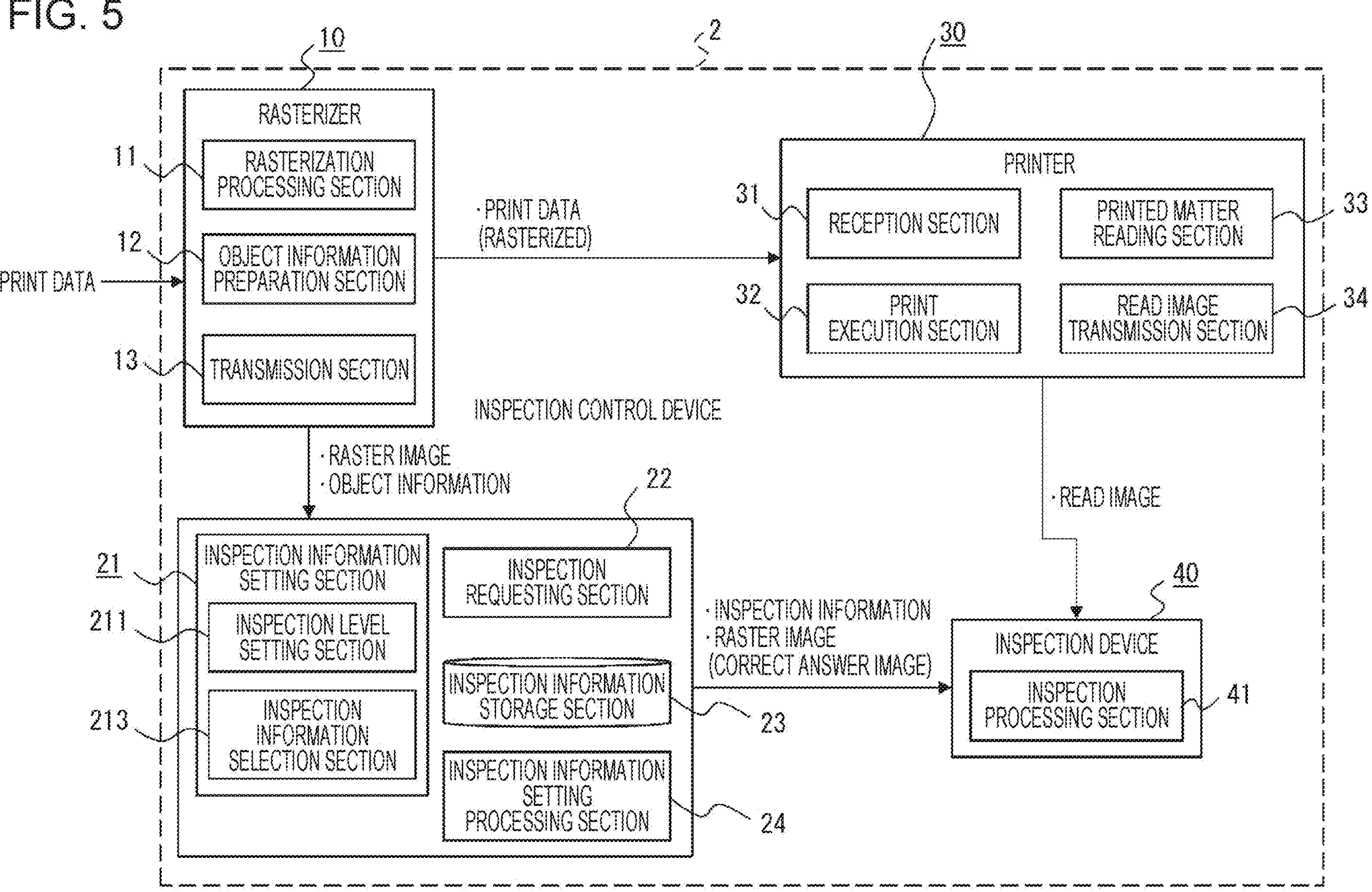
FIG. 5
10
2
30
RASTERIZER
11
RASTERIZATION PROCESSING SECTION
12
OBJECT INFORMATION PREPARATION SECTION
PRINT DATA
13
TRANSMISSION SECTION
· PRINT DATA (RASTERIZED)
PRINTER
31
RECEPTION SECTION
PRINTED MATTER READING SECTION
33
32
PRINT EXECUTION SECTION
READ IMAGE TRANSMISSION SECTION
34
INSPECTION CONTROL DEVICE
· RASTER IMAGE
· OBJECT INFORMATION
22
· READ IMAGE
21
INSPECTION INFORMATION SETTING SECTION
INSPECTION REQUESTING SECTION
211
INSPECTION LEVEL SETTING SECTION
213
INSPECTION INFORMATION SELECTION SECTION
INSPECTION INFORMATION STORAGE SECTION
23
INSPECTION INFORMATION SETTING PROCESSING SECTION
24
· INSPECTION INFORMATION
· RASTER IMAGE (CORRECT ANSWER IMAGE)
40
INSPECTION DEVICE
INSPECTION PROCESSING SECTION
41

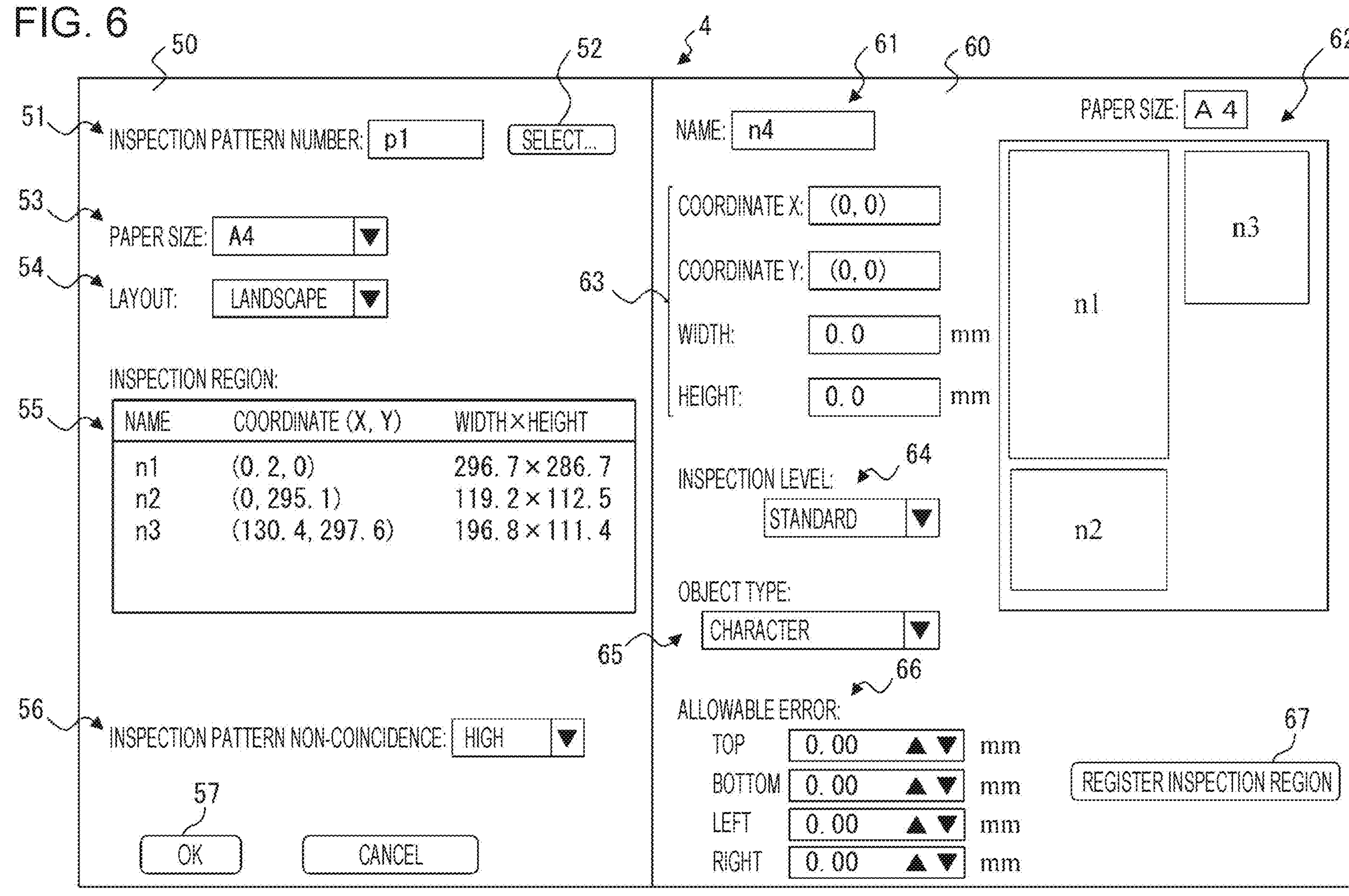
FIG. 6
50
51
52
53
54
55
56
57
4
60
61
62
63
64
65
66
67
INSPECTION PATTERN NUMBER: p1
SELECT...
PAPER SIZE: A4
LAYOUT: LANDSCAPE
INSPECTION REGION:
NAME
COORDINATE (X, Y)
WIDTH×HEIGHT
n1 (0, 2, 0) 296. 7×286. 7
n2 (0, 295. 1) 119. 2×112. 5
n3 (130. 4, 297. 6) 196. 8×111. 4
INSPECTION PATTERN NON-COINCIDENCE: HIGH
OK
CANCEL
NAME: n4
COORDINATE X: (0, 0)
COORDINATE Y: (0, 0)
WIDTH: 0. 0 mm
HEIGHT: 0. 0 mm
INSPECTION LEVEL:
STANDARD
OBJECT TYPE:
CHARACTER
ALLOWABLE ERROR:
TOP 0. 00 mm
BOTTOM 0. 00 mm
LEFT 0. 00 mm
RIGHT 0. 00 mm
PAPER SIZE: A 4
n1
n3
n2
REGISTER INSPECTION REGION

FIG. 7

| NUMBER | SIZE | ORIENTATION | NON-COINCIDENCE | INSPECTION REGION | | | | | | | | | |
|---|---|---|---|---|---|---|---|---|---|---|---|---|---|
| p1 | A4 | LANDSCAPE | HIGH | NAME | COORDINATE | WIDTH | HEIGHT | LEVEL | TYPE | ALLOWABLE ERROR | | | |
| | | | | n1 | (0. 2, 0) | 296. 7 | 286. 7 | STANDARD | CHARACTER | 0. 5 | 0. 5 | 2. 0 | 2. 0 |
| | | | | n2 | (0, 295. 1) | 119. 2 | 112. 5 | HIGH | CHARACTER | 1. 0 | 1. 0 | 0. 0 | 0. 0 |
| | | | | n3 | (130. 4, 297. 6) | 196. 8 | 111. 4 | LOW | IMAGE | 2. 5 | 1. 5 | 3. 5 | 0. 5 |
| ... | | | | | | | | | | | | | |

70
12-56 ZZZZ-CHO,
XXXX CITY, KYOTO
TO: MR. CCCC DDDD
PHONE 0901222094
AMOUNT BILLED: 700,000 YEN
SET
71
73
LOW (IMAGE)
HIGH (CHARACTER)
HIGH (CHARACTER)
LOW (IMAGE)
HIGH (CHARACTER)
LOW (CHARACTER)
LOW (IMAGE)
HIGH (CHARACTER)

INFORMATION PROCESSING APPARATUS, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-145221 filed Sep. 13, 2022.

BACKGROUND

(i) Technical Field

The present disclosure relates to an information processing apparatus, a method, and a non-transitory computer readable medium.

(ii) Related Art

Preparation of high-quality printed matter is requested in digital printing market. To that end, an inspection device is provided to inspect printed matter, that is, the result of printing on paper. Specifically, printed matter is inspected by making a comparison between a read image of the printed matter and an image as a correct answer for the printed matter prepared in advance.

In many cases, printed matter is constituted of a plurality of pages. Some digital printers have a function of printing, page by page, the content of a plurality of pages to be continuously printed. In this case, all the pages do not necessarily have the same content to be printed, and thus it is necessary to prepare an image as a correct answer for each of the pages. In other words, an image as a correct answer may be shared for pages that have the same content to be printed.

Some digital printers have a so-called variable print function of printing different item data for the same data items such as address and name, for example. In order to support the variable print, it is necessary to prepare an image as a correct answer for each of pages, since the pages have different contents to be printed, even if the same page format is used.

In the case where printed matter is to be inspected, inspecting the entire surface of all the pages that constitute the printed matter is burdensome for an inspection device, and is also inefficient as it takes much time.

In some cases, a plurality of objects such as characters and images are printed on pages included in printed matter, for example, and some objects require a high precision while others do not. Thus, hitherto, a range that includes an object that requires a high precision is defined as an inspection region, a range that includes an object that does not require a high precision is defined as a non-inspection region, and an inspection device performs an inspection only in the inspection region on each page. There has hitherto been proposed a technique of performing an inspection in inspection regions with different degrees of precision in accordance with objects (e.g. Japanese Unexamined Patent Application Publication No. 2020-006603).

It is basically necessary to set an inspection region for each page even in the case where an inspection region is set in order to improve the efficiency of inspection.

SUMMARY

As discussed earlier, it has hitherto been necessary for a user to set, for each inspection, inspection information to be used for an inspection of the result of printing of print data to be inspected.

Aspects of non-limiting embodiments of the present disclosure relate to setting inspection information to be used for an inspection of the result of printing to print data without causing a user to set such data for each inspection.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: analyze print data to be inspected, to extract a region including an object included in the print data as an inspection region, for which a print result of the print data is to be inspected; set a precision level of an inspection to be performed on the extracted inspection region; and prepare inspection information including a position of the extracted inspection region and the precision level of the inspection to be performed on the inspection region, to set inspection information to be used for an inspection of the print result to the print data.

BRIEF DESCRIPTION OF THE DRAWINGS

Exemplary embodiments of the present disclosure will be described in detail based on the following figures, wherein:

FIG. 1 illustrates the overall configuration and the block configuration of a print system according to a first exemplary embodiment;

FIGS. 3A to 3H are conceptual views of preparation of an inspection pattern from each page included in a print job according to the present exemplary embodiment;

FIGS. 4A to 4H are conceptual views of setting of an inspection pattern to each page included in a print job according to the present exemplary embodiment;

FIG. 5 illustrates the overall configuration and the block configuration of a print system according to a second exemplary embodiment;

FIG. 6 illustrates an example of an inspection information setting screen according to the second exemplary embodiment;

FIG. 7 illustrates an example of the data configuration of inspection information according to the second exemplary embodiment;

DETAILED DESCRIPTION

Figure 2:
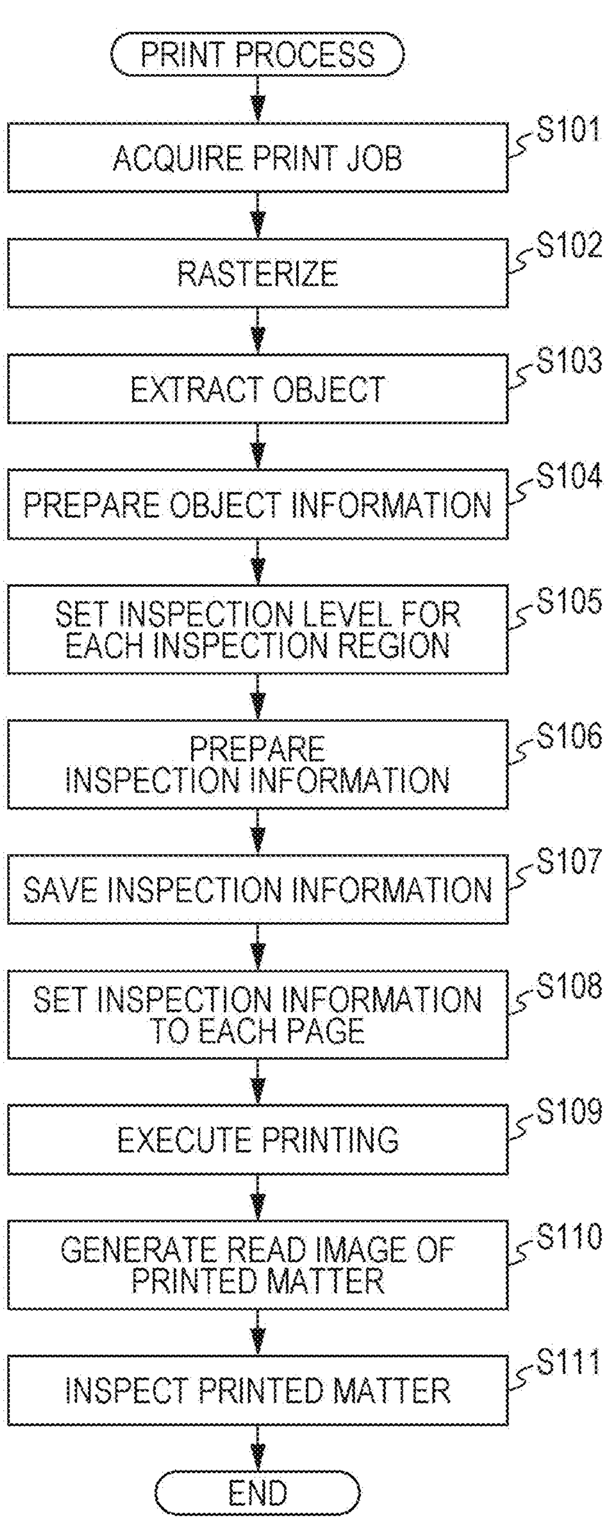
FIG. 2 is a flowchart illustrating a print process according to the first exemplary embodiment.

Exemplary embodiments of the present disclosure will be described below with reference to the drawings.

First Exemplary Embodiment

FIG. 1 illustrates the overall configuration and the block configuration of a print system 2 according to the present exemplary embodiment. The print system 2 according to the present exemplary embodiment includes a rasterizer 10, an inspection control device 20, a printer 30, and an inspection device 40. The devices 10, 20, 30, and 40 include an information processing apparatus (also referred to as a "computer") mounted therein, and demonstrate processing functions to be discussed later by executing a program using a central processing unit (CPU) mounted in the computer. In the present exemplary embodiment, the print system 2 is constituted from four types of devices in accordance with the purpose thereof. In other words, the print system 2 is constituted using a plurality of processors, and may be constituted of a single processor or conversely may be implemented using a larger number of processors.

The rasterizer 10 is a device that has a principal function of rasterizing print data to be printed. The rasterizer 10 according to the present exemplary embodiment includes a rasterization processing section 11, an object information preparation section 12, and a transmission section 13. The rasterization processing section 11 generates a raster image by performing a rasterization process on the print data to be printed. The object information preparation section 12 extracts an object included in the print data by analyzing the generated raster image, and prepares object information including various information by specifying the position of each extracted object on the print data and the type of the object. The transmission section 13 transmits data to the inspection control device 20 and the printer 30 as discussed in detail later.

The inspection control device 20 is implemented by an information processing apparatus that prepares information that is necessary for an inspection by the inspection device 40 and that provides such information to control operation of the inspection device 40. The inspection control device 20 according to the present exemplary embodiment may be constructed with a general-purpose hardware component such as a personal computer (PC). Thus, the inspection control device 20 includes a central processing unit (CPU), a read only memory (ROM), a random access memory (RAM), and a storage unit such as a hard disk drive (HDD), a network interface, and a user interface that receives and displays information.

The inspection control device 20 includes an inspection information setting section 21, an inspection requesting section 22, and an inspection information storage section 23. The inspection information setting section 21 prepares inspection information that is necessary for an inspection by the inspection device 40, and sets the inspection information to print data. The inspection information setting section 21 includes an inspection level setting section 211 and an inspection information preparation section 212. The inspection level setting section 211 sets the precision level (hereinafter simply referred to as an "inspection level") of an inspection to be performed for a region including each object included in print data on the basis of the raster image of the print data and the object information received from the rasterizer 10. The inspection information preparation section 212 prepares inspection information for the print data, and registers the inspection information in the inspection information storage section 23. The inspection requesting section 22 requests the inspection device 40 for an inspection by transmitting the prepared inspection information and the raster image to be used as a correct answer image in the inspection. The inspection information storage section 23 stores the inspection information. The data configuration of the inspection information will be discussed later.

The printer 30 executes printing on the basis of the rasterized print data. The printer 30 is a form of an image forming apparatus that provides at least a print function, a scanner function, etc., and is a device that includes a built-in computer. The printer 30 may be implemented with a hardware configuration that is similar to that according to the related art. That is, the printer 30 includes a CPU, a ROM, a RAM, an HDD as a storage unit, a printer, a scanner, a network interface, etc.

The printer 30 includes a reception section 31, a print execution section 32, a printed matter reading section 33, and a read image transmission section 34. The reception section 31 receives a print job that includes print data to be printed. The print execution section 32 executes printing in accordance with the print job. When printing is executed and printed matter is output, the printed matter reading section 33 reads the printed matter using a scanner, and generates a read image of the print data. The read image transmission section 34 transmits the generated read image to the inspection device 40.

The inspection device 40 inspects the printed matter prepared by the printer 30. The inspection device 40 according to the present exemplary embodiment includes an inspection processing section 41. The inspection processing section 41 performs an inspection to check whether the printed matter has been printed with a required precision or higher.

The constituent elements 11 to 13, 21 and 22, 31 to 34, and 41 of the devices 10, 20, 30, and 40 discussed earlier are implemented through cooperative operation between a computer mounted in each of the devices 10, 20, 30, and 40 and a program that operates on a CPU mounted in the computer. The inspection information storage section 23 is implemented by an HDD mounted in the inspection control device 20. Alternatively, a RAM or a storage unit provided externally may be used by way of a network.

The program used in the present exemplary embodiment may be not only provided by a communication unit but also provided as stored in a computer-readable storage medium such as a Universal Serial Bus (USB) memory. The program provided from the communication unit or the storage medium is installed in a computer, and sequentially executed by a CPU of the computer to perform various processes.

Next, operation according to the present exemplary embodiment will be described.

The print system 2 performs an inspection on printed matter output as a result of executing printing. A print process including an inspection according to the present exemplary embodiment will be described below with reference to the flowchart illustrated in FIG. 2.

The print system 2 acquires a print job including print data to be printed from the outside (step S101). The print job includes one or more pages corresponding to the print data. In the example of the present exemplary embodiment, a plurality of pages are included. The print job includes data on the plurality of pages to be printed, and print attributes such as color or monochrome, paper size, and two-sided printing or single-sided printing. FIGS. 3A to 3D illustrate output images for four pages. The print job occasionally includes pages with different contents as illustrated in FIGS. 3A to 3H. While the print job illustrated in FIGS. 3A to 3H conveniently includes pages of the same size, the print job may be constituted of pages of different sizes.

The rasterization processing section 11 of the rasterizer 10 generates a raster image for each page by performing a rasterization process on each page included in the acquired print job. Subsequently, the object information preparation section 12 extracts an object included in each page by analyzing the generated raster image (step S103). More particularly, the object information preparation section 12 extracts an object included in each page, and specifies the position of each extracted object on the page and the type of the object. The extraction of an object and the specification of the object type may be performed using a technique according to the related art.

The position of an object on the page may be expressed as in the related art. The object information preparation section 12 extracts a rectangular range including the object as an inspection region in which an inspection is to be performed on the result of printing of the page. The position of the inspection region may be expressed by coordinate data of the inspection region (e.g. the coordinate position of the upper left corner of the inspection region) using a reference position, e.g. the upper left corner, of paper to which the page is to be output defined as a reference position (specifically, the origin (0, 0) of a two-dimensional coordinate system). The size of the inspection region may be expressed by a width (X-coordinate direction) and a height (Y-coordinate direction) from the position indicated by the coordinate data on the inspection region.

Examples of the object type include characters and images. The object information preparation section 12 prepares, for each print job, object information including the position and the type of each object included in each page (step S104). Subsequently, the transmission section 13 transmits the raster image and the object information to the inspection control device 20, and transmits a print job including the rasterized print data to the printer 30.

When the inspection control device 20 acquires the raster image and the object information from the rasterizer 10, the inspection level setting section 211 of the inspection information setting section 21 sets the inspection level for each inspection region included in each page (step S105). The inspection level is set in accordance with the object type, and the inspection level setting section 211 according to the present exemplary embodiment automatically sets, to an inspection region including an object, the inspection level initially set for the type of the object. For example, the inspection level for characters is set to "high", since the characters would be meaningless if not readable. On the other hand, the inspection level for images is set to "low", since the content of the objects may be discriminable even if the images are not so clear as the characters.

While the inspection level is set to "high" and "low" in the present exemplary embodiment and set to "high", "standard", "low", and "not applicable" in a second exemplary embodiment to be discussed later, the steps of the level are not necessarily limited thereto. In the present exemplary embodiment, for convenience of description, the object type is defined as "character" and "image", and the inspection level is defined as "high" and "low". However, the objects occasionally include a combination of characters and images. While the objects are binarized into "character" and "image" in accordance with the component ratio between characters and images and a threshold in the present exemplary embodiment, the objects may be divided into a larger number of types in accordance with the component ratio, character size, color attribute, etc., and the inspection level may be set to a larger number of steps in accordance with the object type.

Subsequently, the inspection information setting section 21 prepares inspection information including the position of the inspection region on each page and the precision level, that is, the inspection level, of an inspection to be performed on the inspection region (step S106). The image of preparation of the inspection information will be described with reference to FIGS. 3A to 3H.

A print image of each page included in a print job is illustrated in FIGS. 3A to 3D in the upper row, and an inspection pattern prepared from each page is illustrated in FIGS. 3E to 3H in the lower row. Since the inspection pattern is a conceptual view in which the prepared inspection information is schematically depicted, the "inspection information" and the "inspection pattern" are synonyms and indicate the same information.

For example, in the page illustrated in FIG. 3A, a character object is positioned in the upper part, and an image object is positioned in the lower left part. The inspection information setting section 21 extracts rectangular regions including the objects as inspection regions in which an inspection is to be performed on the result of printing of the page.

The inspection information setting section 21 correlates the inspection level set by the inspection level setting section 211 on the basis of the object type with the inspection regions including the objects. The inspection information setting section 21 prepares an inspection pattern from each page in this manner. When an inspection pattern (i.e. inspection information) is prepared, the inspection information preparation section 212 saves the inspection pattern in the inspection information storage section 23 (step S107). The inspection information setting section 21 sets the inspection information prepared as described above to the page referenced during the preparation of the inspection information by correlating the inspection information with the page (step S108). That is, an inspection pattern prepared from a certain page is set, as it is, as an inspection pattern for the page.

In some cases, inspection patterns prepared from pages are similar to each other, even if the contents of the pages are completely different from each other, as illustrated in FIGS. 3B, 3C, 3F, and 3G. The term "similar" as used herein refers to a state in which the positions and the sizes of inspection regions extracted from pages are the same as or substantially coincide with each other, and in which inspection patterns allocated to the corresponding inspection regions are the same as or substantially coincide with each other. The term "coincide" may be an example of a term that indicates the highest degree of similarity. For example, the term is used in the case where inspection regions to be compared have the same size but are slightly different in position, or are at the same position relative to the reference position (e.g. the coordinate position of the upper left corner of the inspection regions) but are slightly different in size. A threshold represented by the ratio, number of dots, etc. is set in advance for such differences, and it is determined whether or not the inspection regions are similar in accordance with a comparison with the threshold. It is determined that the inspection regions are similar in the case where the number of coinciding inspection patterns relative to the number of inspection regions is a threshold or more. For example, it is determined that the inspection regions are similar in the case where the difference in size between the inspection regions is less than 5% or nine inspection regions out of ten have the same inspection pattern.

An inspection pattern prepared from the page illustrated in FIG. 3B is used as an inspection pattern for the page illustrated in FIG. 3C, while the inspection region in FIG.

3G is slightly smaller when corresponding inspection patterns in FIGS. 3F and 3G, the object type for which is image, are compared with each other, since the difference in size is less than a threshold. That is, it is considered that the pages illustrated in FIGS. 3B and 3C share the inspection pattern illustrated in FIG. 3F. When an inspection pattern is shared, it is not necessary to save an inspection pattern (FIG. 3G in the above example) that is rendered unnecessary by the sharing in the inspection information storage section 23. That is, the inspection region in FIG. 3G is not saved. The number of inspection patterns to be saved in the inspection information storage section 23 may be decreased by sharing an inspection pattern to be used for inspection in this manner.

While an inspection pattern prepared from the page in FIG. 3B is shared here, an inspection pattern prepared from the page in FIG. 3C may be shared as the inspection pattern for the pages illustrated in FIGS. 3B and 3C. Alternatively, an inspection pattern to be shared may be prepared separately by averaging the positions and the sizes of the inspection regions in the inspection patterns illustrated in FIGS. 3F and 3G.

In the present exemplary embodiment, basically, it is only necessary that the inspection information setting section 21 should set an inspection pattern prepared from a page, as it is, to the page. As described with reference to FIGS. 3F and 3G, however, the inspection information setting section 21 may read an adaptable inspection pattern from among inspection patterns previously prepared by the inspection information preparation section 212 for other pages and saved in the inspection information storage section 23, and set the inspection pattern to a page. An example of such setting is illustrated in FIGS. 4A to 4H. As illustrated in FIGS. 4A to 4H, a shared inspection pattern (FIG. 4F) is set to a plurality of pages (FIGS. 4B and 4C) with different contents.

Regions that include an object are occasionally roughly divided into "inspection regions" to be subjected to an inspection and "non-inspection regions" not to be subjected to an inspection, in order to improve the inspection efficiency. In general, such regions are rectangular in shape. In the present exemplary embodiment, regions that include an object are determined as "inspection regions". That is, the term "inspection region" as used in the context of the present exemplary embodiment should not be narrowly construed as an "inspection region" that is obtained when rectangular regions that include an object are divided into "inspection regions" and "non-inspection regions", but should be broadly construed as one of rectangular regions that include an object to be divided into "inspection regions" and "non-inspection regions". While one of two inspection levels "high" and "low" is selectively set as the inspection level in the present exemplary embodiment for convenience of description, "not applicable" indicating that no inspection is to be performed is set as an inspection level to be set to inspection regions in a second exemplary embodiment to be discussed later. Inspection regions set to the inspection level "not applicable" correspond to the "non-inspection regions" discussed earlier.

As described above, when inspection information is prepared in the inspection control device 20, the inspection requesting section 22 requests inspection of each page, by transmitting inspection information corresponding to each page included in a print job and a raster image acquired from the rasterizer 10 to the inspection device 40 as a correct answer image for inspection. The inspection requesting section 22 may transmit the raster image acquired from the rasterizer 10, or may transmit a correct answer image cut out from the raster image and having a position and a size corresponding to those of each inspection pattern. In this event, it is necessary to take into consideration sharing of the inspection pattern and an allowable error. The allowable error will be described in relation to the second exemplary embodiment.

When a print request is received by the reception section 31 receiving a print job in the printer 30, the print execution section 32 executes printing of print data included in the print job in accordance with attribute information (step S108). Since printed matter such as those illustrated in FIGS. 3A to 3D is output when printing is executed, the printed matter reading section 33 generates a read image of the printed matter by reading the printed matter using a scanner (step S110). The read image transmission section 34 transmits the thus generated read image of each page to the inspection device 40.

In the manner described above, the inspection device 40 acquires inspection information and a raster image corresponding to a single print job from the inspection control device 20, and acquires a read image of printed matter output on the basis of the print job from the printer 30. As discussed earlier, the inspection information includes the position and the range and the inspection level of each inspection region included in each page, and the raster image includes a correct answer image for each inspection region, and thus the inspection processing section 41 collates, for each inspection region in each page, the correct answer image for the inspection region and a read image of the inspection region included in the read image, and inspects printed matter in accordance with the corresponding inspection level (step S111). That is, inspection is performed. It may be determined that the precision of printed matter is higher as the degree of coincidence of a read image of the printed matter with the correct answer image is higher, and the specific content of an inspection performed in accordance with the inspection level may be the same as that according to the related art, and thus is not described.

Second Exemplary Embodiment

FIG. 5 illustrates the overall configuration and the block configuration of a print system 2 according to the present exemplary embodiment. Constituent elements that are the same as those according to the first exemplary embodiment illustrated in FIG. 1 are denoted by the same reference numerals to omit description as appropriate.

The print system 2 according to the present exemplary embodiment is slightly different from that according to the first exemplary embodiment in the configuration of the inspection control device 20. Specifically, the inspection control device 20 additionally includes an inspection information setting processing section 24. In addition, the inspection information setting section 21 includes an inspection information selection section 213 in place of the inspection information preparation section 212. The inspection information setting processing section 24 prepares inspection information on the basis of item data set by a user via a user interface, and registers the inspection information in the inspection information storage section 23. That is, while inspection information is automatically prepared from pages included in a print job in the first exemplary embodiment described above, the user is caused to prepare inspection information in the present exemplary embodiment.

To prepare inspection information, the user causes the inspection information setting processing section 24 to display an inspection information setting screen 4 on the screen by logging in to the inspection control device 20 and performing a predetermined operation.

FIG. 6 illustrates an example of the inspection information setting screen 4 according to the present exemplary embodiment. The user is able to prepare inspection information and make a change in setting of the prepared inspection information on the inspection information setting screen 4. The inspection information setting screen 4 is constituted of a region 50 disposed on the left side of the drawing to allow setting and display of information about inspection information, and a region 60 disposed on the right side of the drawing to allow setting of an inspection region, to which the inspection information is to be set.

The region 50 allows setting of items to be set for each inspection pattern. An inspection pattern number 51 indicates a number as information that identifies an inspection pattern, that is, inspection information. The inspection information setting processing section 24 automatically allocates a number when a new piece of inspection information is prepared. The user causes a list of prepared inspection patterns to be displayed by selecting a select button 52, and selects a piece of inspection information, the content of setting of which is desired to be changed, from among the list. The inspection information setting processing section 24 reads the piece of inspection information selected by the user from the inspection information storage section 23, and displays the inspection information on the inspection information setting screen 4 to allow the user to change the inspection information.

A paper size 53 indicates the size of paper on which pages are to be printed. A layout 54 indicates the direction of the paper. An inspection region 55 displays a list of pieces of information about inspection regions set in the region 60. While the inspection regions include setting items indicated in the region 60, only some of the setting items are extracted and displayed in the inspection region 55. It is not necessary that the items to be displayed should be the items indicated in FIG. 6, and all the set items may be displayed so as to be scrollable in the horizontal direction.

While an inspection pattern adapted to a page to be processed is selected from among pieces of inspection information saved in the inspection information storage section 23 to be linked as discussed later in the present exemplary embodiment, an inspection is performed on the entire page in the case where an adapted inspection pattern is not registered in the inspection information storage section 23. Inspection pattern non-coincidence 56 allows setting of the inspection level (hereinafter referred to as an "entire surface inspection level") for a case where an inspection is to be performed on the entire page. Non-adapted inspection information set in the inspection pattern non-coincidence 56 is registered in the inspection information storage section 23 as with other inspection information. In the present exemplary embodiment, selectable options include "high", "standard", "low", and "not applicable". It is not necessary that the number of inspection levels should be limited to four as a matter of course. Among these options, "not applicable" means that an inspection is not to be performed on any part of the page.

It is necessary that the "inspection pattern adapted to a page" should be an inspection pattern that is the most similar in position and size to an inspection region included in the page, among at least the inspection patterns (synonymous with "inspection information") registered in the inspection information storage section 23. The term "coincide" is an example of a term that indicates the highest degree of similarity. Further, the "inspection pattern adapted to a page" may be limited to an inspection pattern with a number of inspection regions that include an object of a type that coincides with the type of an object included in inspection regions located at corresponding positions on the page, the number being a predetermined threshold or more.

The region 60 allows setting of items for each inspection region to be included in an inspection pattern. A name 61 indicates a name that identifies the inspection region. A display region 62 indicates the positions of inspection regions on the page, and indicates the page layout of the inspection regions. Position information 63 indicates information that indicates the position and the range of the inspection regions on the page. The position information 63 is specified by the coordinate data on the upper left corner of the inspection region with the upper left corner of a page, that is, the display region 62 that displays the page, to serve as the reference position defined as the origin, and the width (in the right-left direction of the drawing in FIG. 6) and the height (in the up-down direction of the drawing in FIG. 6) from the upper left corner of the inspection region. The position and the size of the inspection region may be specified by the user specifying the range of the inspection region through a mouse operation performed in the display region 62, for example. In this case, the values of the position information 63 are automatically set in accordance with the display position and the range in the display region 62. Conversely, the positions and the ranges of the inspection region may be automatically displayed in the display region 62 when the values of the position information 63 are set by the user. The values of the position information 63 and the specification of the inspection region in the display region 62 may be coordinated with each other in this manner.

An inspection level 64 indicates the inspection level set to the inspection region. The inspection information setting processing section 24 may allow display of a list of inspection levels that may be set in accordance with a user operation and allow the user to select one of the inspection levels from among the list to be set. An object type 65 indicates the type of an object to be set to the inspection region.

As discussed earlier, the position and the size of an inspection region are set using the display region 62 or the position information 63. There is a possibility that an object included in the actual page slightly protrudes from the range of an inspection region set in inspection information. Thus, an allowable error 66 may be used to set the allowable range of protrusion of a region that includes the object from the inspection region.

Setting of an inspection region is finished by selecting a register inspection region button 67 after desired values are set to the items in the region 60 as described above. The inspection region, setting of which has been finished, is displayed in the inspection region 55 in the region 50. The user selects an OK button 57 when setting of desired inspection regions is completed. Consequently, the inspection information setting processing section 24 prepares inspection information in accordance with the item data set by the user, and registers the inspection information in the inspection information storage section 23.

FIG. 7 illustrates an example of the data configuration of inspection information according to the second exemplary embodiment. The inspection information includes item data set on the inspection information setting screen 4. The items included in the inspection information are the same as those in FIG. 6, and thus will not be described.

The inspection information preparation section 212 according to the first exemplary embodiment automatically prepares inspection information by analyzing a page, although not described above in relation to the first exemplary embodiment. Only the inspection pattern non-coincidence ("non-coincidence" indicated in FIG. 7) is not included in the inspection information. Initially set values are used for the allowable error.

It is assumed that the work of registering inspection information is performed by one or more specific users. In this case, it is considered that the users generally make similar settings. For example, a certain user may set equal error values for the allowable error 66, irrespective of the size of the inspection region. In the case where the object type is character, a user may always set the inspection level 64 to "high". That is, the inspection information setting processing section 24 is able to specify a user that logs in to prepare inspection information, and thus learns item data set by each specified user and calculates initial values of items for the user. With initial values calculated for each user in this manner, the initial values obtained through learning are displayed for the relevant items when the user has the inspection information setting screen 4 to be displayed. In this case, it is necessary that the inspection information should include identification information on the user that has registered the inspection information.

Figure 8:
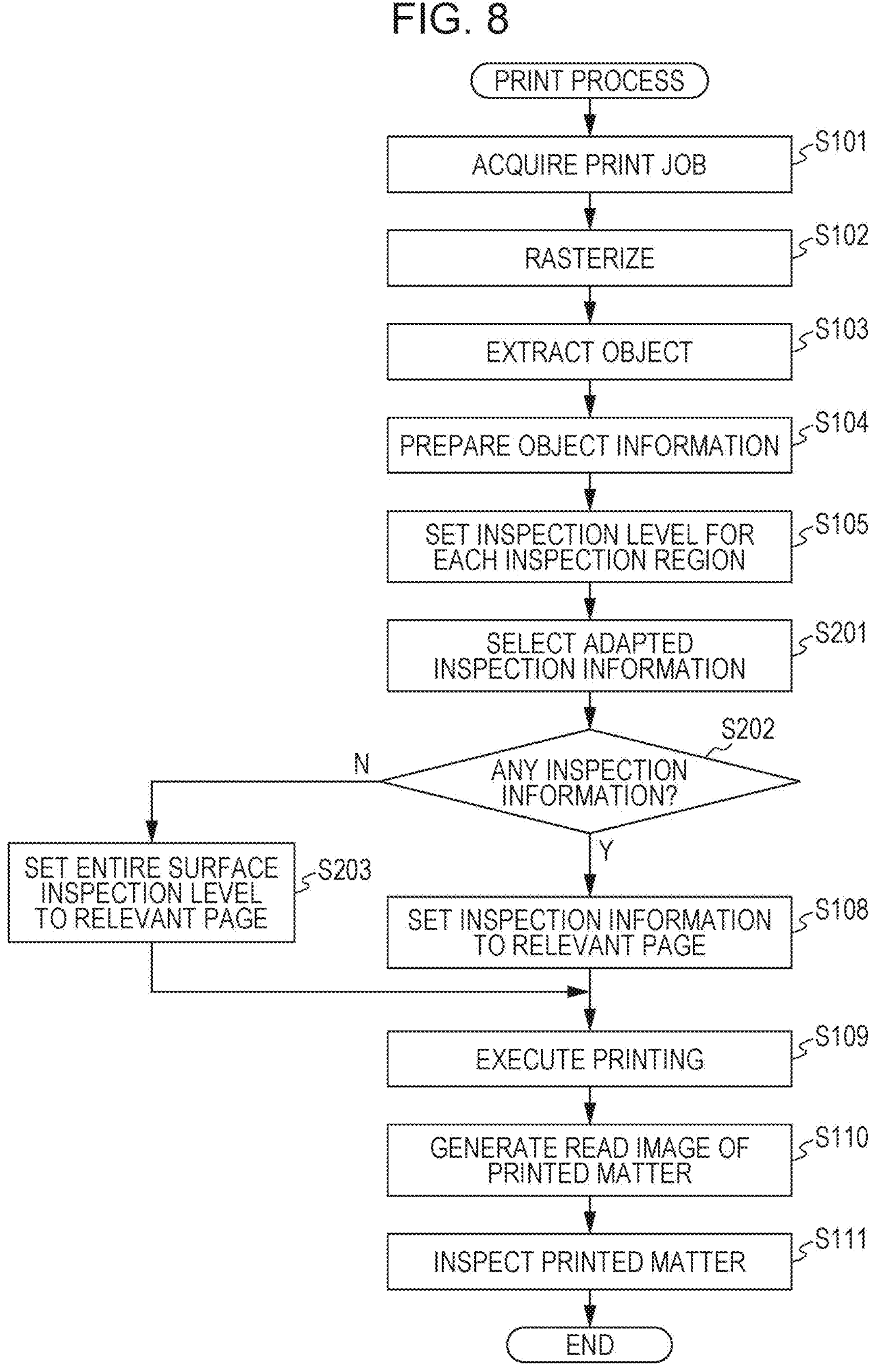
FIG. 8 is a flowchart illustrating a print process according to the second exemplary embodiment.

Next, a print process including inspection according to the present exemplary embodiment will be described with reference to the flowchart illustrated in FIG. 8. Processes that are the same as those according to the first exemplary embodiment are denoted by the same step numbers to omit description as appropriate. The print process according to the present exemplary embodiment is different in the process performed by the inspection control device 20, specifically the process of setting inspection information to each page, as only the configuration of the inspection control device 20 is different.

That is, when the inspection level setting section 211 sets the inspection level for each inspection region in the inspection control device 20 (step S105), the inspection information selection section 213 collates the positions and the sizes of inspection regions on the page to be processed with position information on the inspection information registered in the inspection information storage section 23, and selects inspection information that has the matching position information as inspection information adapted to the page to be processed (step S201). The allowable error included in the inspection information is referenced to determine whether the inspection regions match the position information.

Figure 9:
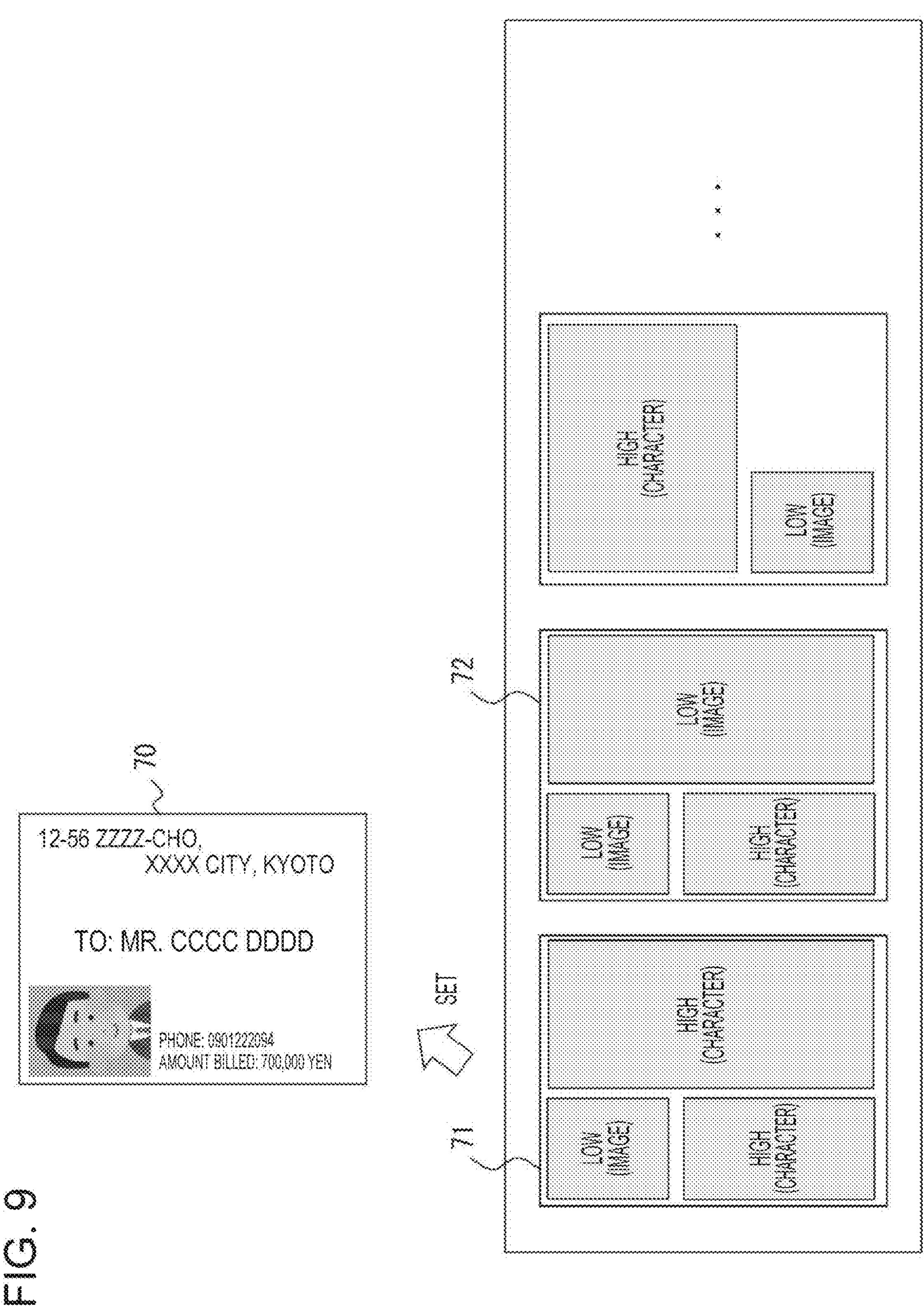
FIG. 9 illustrates a specific example of a process of selecting an inspection pattern adapted to a page according to the second exemplary embodiment.

FIG. 9 illustrates a specific example of a process of selecting an inspection pattern adapted to a page according to the second exemplary embodiment.

For example, it is assumed that two inspection patterns 71 and 72 match the positions and the shapes of inspection regions specified from a page 70. In this case, the types of objects in the inspection regions included in the page 70 are specified, and an inspection pattern with the largest number of specified objects of the matching types is selected. In the example of the inspection patterns 71 and 72 illustrated in FIG. 9, the inspection pattern 71 in which the type of the object on the right half of the page coincides with that in the page 70 and the types of the objects in all the inspection regions match those in the page 70 is selected as an inspection pattern with the largest number of objects of the matching types.

Figure 10:
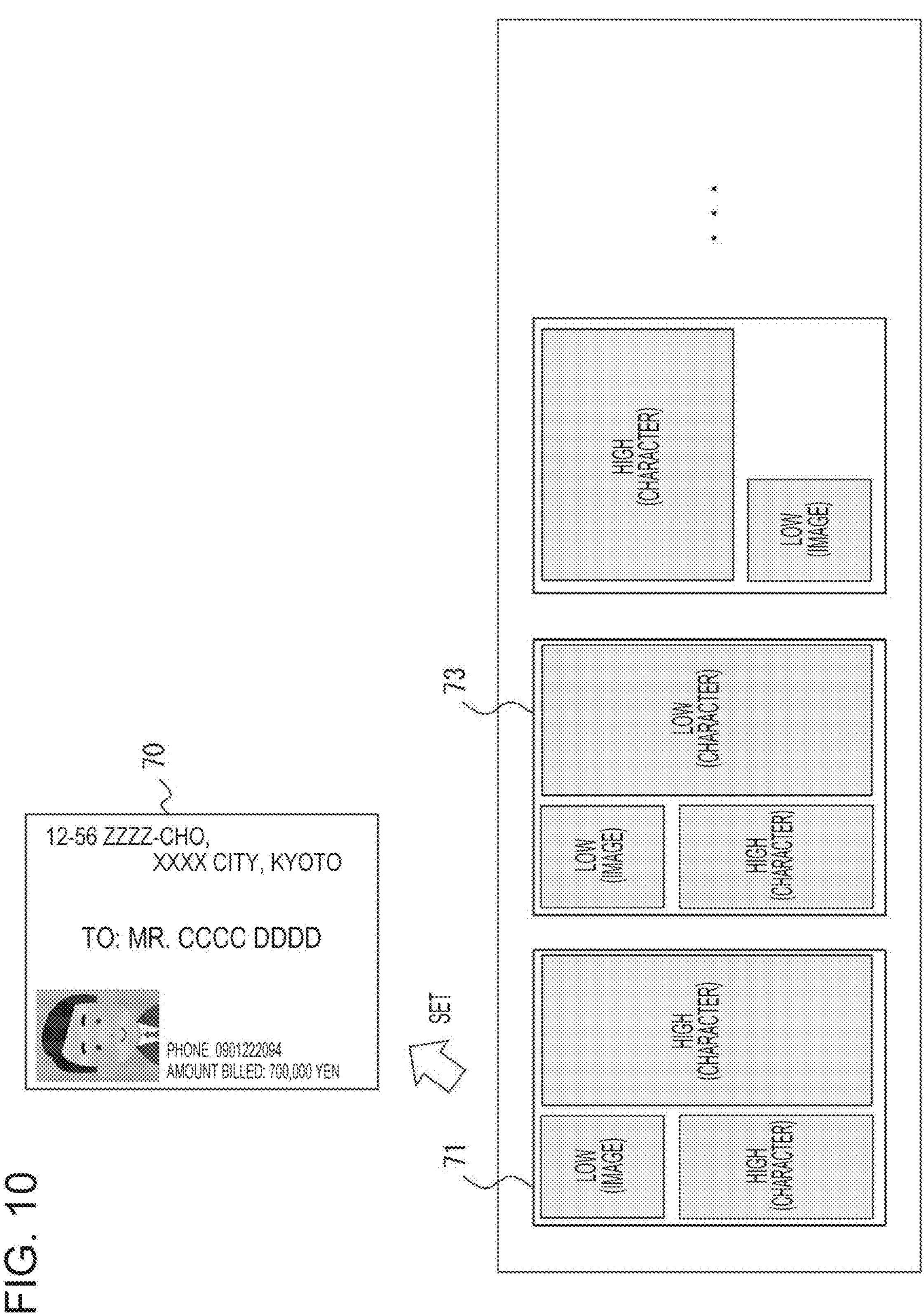
FIG. 10 illustrates another specific example of a process of selecting an inspection pattern adapted to a page according to the second exemplary embodiment.

FIG. 10 illustrates another specific example of a process of selecting an inspection pattern adapted to a page according to the second exemplary embodiment.

For example, it is assumed that two inspection patterns 71 and 73 match the page 70 for the positions and the shapes of regions including objects. In this example, the types of the objects of the inspection patterns 71 and 73 perfectly coincide with those of the page 70, and thus the number of objects of the matching types is the same and the largest for the inspection patterns 71 and 73. In this case, in the present exemplary embodiment, an inspection pattern with the higher inspection level is selected from the viewpoint of print precision. In the example of the inspection patterns 71 and 73 illustrated in FIG. 10, the inspection pattern 71 with the higher inspection level on the right half of the page than the inspection pattern 73 is selected.

In the case where inspection information adapted to the page to be processed is selected in step 201 (Y in step 202), the inspection information setting section 21 sets the selected inspection information to the page, and the inspection requesting section 22 requests each page to be inspected by transmitting the inspection information corresponding to each page included in the print job and the raster image acquired from the rasterizer 10 as a correct answer image for inspection. The subsequent processes (steps 109 to 111) may be the same as those according to the first exemplary embodiment.

In the case where inspection information that matches the page to be processed is not present and not selected (N in step 202), on the other hand, the inspection information setting section 21 sets the entire surface inspection level set in the inspection pattern non-coincidence 56 in FIG. 6 to the entire surface of the page (step S203). The subsequent processes (steps 109 to 111) may be the same as those according to the first exemplary embodiment.

With the present exemplary embodiment, an inspection pattern is set to each page as described above, and the inspection device 40 performs an inspection on the page using the set inspection pattern.

While inspection patterns to be set to pages are automatically prepared in the first exemplary embodiment and manually prepared by the user in the second exemplary embodiment as discussed earlier, the inspection information storage section 23 may store the automatically prepared inspection information and the manually prepared inspection information in a mixed manner. That is, the first exemplary embodiment and the second exemplary embodiment may be combined as appropriate.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured to:

analyze print data to be inspected, to extract a region including an object included in the print data as an inspection region, for which a print result of the print data is to be inspected;

set a precision level of an inspection to be performed on the extracted inspection region; and prepare inspection information including a position of the extracted inspection region and the precision level of the inspection to be performed on the inspection region, to set inspection information to be used for an inspection of the print result to the print data.

(((2)))

The information processing apparatus according to (((1))), wherein the processor is configured to:

generate a raster image of the print data; and prepare inspection information for the print data by analyzing the raster image.

(((3)))

The information processing apparatus according to (((2))), wherein the processor is configured to:

specify a type of an object included in the inspection region by analyzing the raster image; and set the precision level of the inspection to be performed on the inspection region in accordance with the specified type of the object.

(((4)))

The information processing apparatus according to (((1))), wherein, in a case where an inspection information storage unit in which a plurality of pieces of inspection information are registered is provided, the pieces of inspection information each including a position of the inspection region extracted from the print data, a type of the object included in the inspection region, and the precision level of the inspection to be performed on the inspection region, the processor sets a piece of inspection information selected from the inspection information storage unit to the print data to be inspected, rather than preparing inspection information.

(((5)))

The information processing apparatus according to (((4))), wherein inspection information previously prepared for other print data is registered in the inspection information storage unit.

(((6)))

The information processing apparatus according to (((4))), wherein inspection information set by a user is registered in the inspection information storage unit.

(((7)))

The information processing apparatus according to (((6))), wherein non-adapted inspection information is registered in the inspection information storage unit as inspection information to be set to the print data to be inspected, the non-adapted inspection information being set in a case where inspection information adapted to the print data is not registered.

(((8)))

The information processing apparatus according to (((4))), wherein the processor is configured to select, as inspection information to be set to the print data, inspection information that includes an inspection region that is most similar in range to the inspection region extracted by analyzing the print data.

(((9)))

The information processing apparatus according to (((4))), wherein the processor is configured to:

specify, in a case where a plurality of inspection regions are included in the print data to be inspected, types of objects included in the inspection regions by analyzing the print data; and compare the types of the objects in the inspection regions included in the print data with types of objects included in inspection regions included in the inspection information registered in the inspection information storage unit at positions corresponding to the inspection regions included in the print data, and select, as inspection information to be set to the print data, a piece of the inspection information with a largest number of objects of matching types among pieces of the inspection information registered in the inspection information storage unit.

(((10)))

A program causing a computer to execute a process comprising:

analyzing print data to be inspected, to extract a region including an object included in the print data as an inspection region, for which a print result of the print data is to be inspected, setting a precision level of an inspection to be performed on the extracted inspection region, and preparing inspection information including a position of the extracted inspection region and the precision level of the inspection to be performed on the inspection region, to set inspection information to be used for an inspection of the print result to the print data.

What is claimed is:

1. An information processing apparatus comprising:

a storage unit; and a processor programmed to:

generate a raster image of each page of a plurality of pages of print data to be inspected;

detect one or more objects in each page of the plurality of pages based on the generated raster image of the corresponding page:

extract, for each page of the plurality of pages, a set of inspection regions, wherein each inspection region in the set of inspection regions includes at least one of the detected objects;

set a precision level of an inspection to be performed for each inspection region in the set of inspection regions of the corresponding page;

prepare inspection information for each page the inspection information including the precision level and position of the inspection regions of the corresponding page;

compare similarity of the inspection regions included in the prepared inspection information between the pages to a predetermined threshold, based on at least one of a position and the size of the inspection regions;

in response to determining that the similarity of the inspection regions between two or more pages is greater than the predetermined threshold, register, in the storage unit, the inspection information corresponding to the determined similar inspection regions, wherein the registered inspection information is shared by the two or more pages;

receive a read image corresponding to at least one of the plurality of pages; and perform an inspection of the read image, including:

applying the registered inspection information retrieved from the storage unit to the read image based on position correspondence between the registered inspection regions and the read image; and inspecting portions of the read image corresponding to the registered inspection regions based on the precision level included the registered inspection information.

2. The information processing apparatus according to claim 1, wherein the processor is programmed to:

prepare the inspection information for each page of the plurality of pages by analyzing the raster image.

3. The information processing apparatus according to claim 2, wherein the processor is programmed to:

specify a type of the object included each inspection region in the set of inspection regions by analyzing the raster image; and set the precision level of the inspection to be performed on each inspection region in accordance with the specified type of the object.

4. The information processing apparatus according to claim 1, wherein, in a case where the storage unit in which a plurality of pieces of inspection information are registered is provided, the pieces of inspection information each including the position of the inspection regions, a type of the object included in each of the inspection regions, and the precision level of the inspection to be performed in each of the inspection regions, the processor retrieves a piece of registered inspection information selected from the storage unit and applies the retrieved inspection information to the read image based on position correspondence.

5. The information processing apparatus according to claim 4, wherein the inspection information previously prepared for other pages is registered in the storage unit.

6. The information processing apparatus according to claim 4, wherein inspection information set by a user is registered in the storage unit.

7. The information processing apparatus according to claim 6, wherein non-adapted inspection information is registered in the storage unit, and the non-adapted inspection information is applied in a case where inspection information corresponding to the page is not registered.

8. The information processing apparatus according to claim 4, wherein the processor is programmed to select, as inspection information to be applied to the read image, the inspection information that includes an inspection region that is most similar in position and size to the inspection regions extracted for each page of the plurality of pages.

9. The information processing apparatus according to claim 4, wherein the processor is programmed to:

specify, for each page of the plurality of pages, the types of the objects included in the inspection regions by analyzing the print data; and compare the types of the objects in the inspection regions included in the page with the types of the objects included in inspection regions included in the inspection information registered in the storage unit at the position corresponding respectively to the inspection regions included in the page, and select inspection information to be applied to the read image with a largest number of objects of matching types among pieces of the inspection information registered in the storage unit.

10. A method comprising:

generating a raster image of each page of a plurality of pages of print data to be inspected;

detecting one or more objects in each page of the plurality of pages based on the generated raster image of the corresponding page;

extracting, for each page of the plurality of pages, a set of inspection regions, wherein each inspection region in the set of inspection regions includes at least one of the detected objects:

setting a precision level of an inspection to be performed for each inspection region in the set of inspection regions of the corresponding page;

preparing inspection information for each page the inspection information including the precision level and position of the inspection regions of the corresponding page:

comparing similarity of inspection regions included in the prepared inspection information between the pages to a predetermined threshold, based on at least one of a position and the size of the inspection regions;

in response to determining that the similarity of the inspection regions between two or more pages is greater than the predetermined threshold, registering the inspection information corresponding to the similar inspection regions in a storage unit, wherein the registered inspection information is shared by the two or more pages;

receiving a read image corresponding to at least one of the plurality of pages; and performing an inspection of the read image by applying the registered inspection information retrieved from the storage unit to the read image based on position correspondence between the registered inspection regions and the read image and inspecting portions of the read image corresponding to the registered inspection regions based on the precision level included the registered inspection information.

11. A non-transitory computer readable medium storing a program causing a computer processor to execute a process comprising:

generating a raster image of each page of a plurality of pages of print data to be inspected;

detecting one or more objects in each page of the plurality of pages based on the generated raster image of the corresponding page:

extracting, for each page of the plurality of pages, a set of inspection regions, wherein each inspection region in the set of inspection regions includes at least one of the detected objects:

setting a precision level of an inspection to be performed for each inspection region in the set of inspection regions of the corresponding page;

preparing inspection information for each page the inspection information including the precision level and position of the inspection regions of the corresponding page;

comparing similarity of inspection regions included in the prepared inspection information between the pages to a predetermined threshold, based on at least one of a position and the size of the inspection regions;

in response to determining that the similarity of the inspection regions between two or more pages is greater than the predetermined threshold, registering the inspection information corresponding to the similar inspection regions in a storage unit, wherein the registered inspection information is shared by the two or more pages;

receiving a read image corresponding to at least one of the plurality of pages; and performing an inspection of the read image by applying the registered inspection information retrieved from the storage unit to the read image based on position correspondence between the registered inspection regions and the read image and inspecting portions of the read image corresponding to the registered inspection regions based on the precision level included the registered inspection information.

* * * * *